United States Patent
Mizushima et al.

(10) Patent No.: US 7,110,335 B2
(45) Date of Patent: Sep. 19, 2006

(54) RECORDING AND REPRODUCING METHOD FOR OPTICAL RECORDING MEDIUM AND OPTICAL RECORDING MEDIUM

(75) Inventors: Tetsuro Mizushima, Tokyo (JP); Jiro Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 200 days.

(21) Appl. No.: 10/498,216

(22) PCT Filed: Dec. 6, 2002

(86) PCT No.: PCT/JP02/12836

§ 371 (c)(1),
(2), (4) Date: Jun. 10, 2004

(87) PCT Pub. No.: WO03/050804

PCT Pub. Date: Jun. 19, 2003

(65) Prior Publication Data

US 2005/0007927 A1     Jan. 13, 2005

(30) Foreign Application Priority Data

Dec. 12, 2001    (JP)    ............................ 2001-378858

(51) Int. Cl.
*G11B 7/00*      (2006.01)
*G11B 7/24*      (2006.01)

(52) U.S. Cl. .................. 369/47.5; 369/59.11; 369/116; 369/275.1

(58) Field of Classification Search ...................... None
See application file for complete search history.

(56) References Cited

U.S. PATENT DOCUMENTS 6,033,752 A     3/2000    Suzuki et al.
6,243,326 B1 *   6/2001    Sumi et al. ............... 369/13.29
2002/0054565 A1 *   5/2002    Komaki et al. ............. 369/283
2003/0147629 A1 *   8/2003    Kikuchi et al. ............... 386/69

FOREIGN PATENT DOCUMENTS

| EP | 1 063 644 A2 | 12/2000 |
| JP | B2 4-838 | 2/1982 |
| JP | A-04-000838 | 1/1992 |

* cited by examiner

OTHER PUBLICATIONS

Kato, Tatsuya et al. "The phase change optical disc with the data recording rate of 140 Mbps." *Technical Digest ISOM2001*, Oct. 2001, pp. 200-201.

*Primary Examiner*—Muhammad Edun
(74) *Attorney, Agent, or Firm*—Oliff & Berridge, PLC

(57) ABSTRACT

A write-once type optical recording medium is provided, which is low-cost and capable of maintaining the recording and reproducing stability high while enabling the relative ratio of read power to write power to be set high.

The high-speed write-once type optical recording medium 10 includes a recording layer 18 that is constituted by laminating first and second subsidiary recording layers 18A and 18B each having one type of metal, for example Al and Sb respectively, as the main component. In the optical recording medium 10 having such constitution, the ratio between write power Pw and read power Pr, Pw/Pr is set to a value in the range of 2.0 to 8.0. When the recording layer 18 is irradiated with laser beam with a wavelength of 200 nm to 450 nm and a write power Pw of 2.5 to 5.0 mW at a recording-transferring rate of at least 35 Mps, Al and Sb contained in the subsidiary recording layers 18A and 18B respectively are diffused and mixed by the irradiation to form a recording mark that has a low reflectance, has been transformed to a single layer, and has been changed irreversibly.

7 Claims, 1 Drawing Sheet

RECORDING AND REPRODUCING METHOD FOR OPTICAL RECORDING MEDIUM AND OPTICAL RECORDING MEDIUM

TECHNICAL FIELD

The present invention relates to a recording and reproducing method for an optical recording medium, particularly to a recording and reproducing method for an optical recording medium capable of rewriting at high speed and enabling the relative ratio of read power to write power to be set high.

BACKGROUND ART

In recent years, there has been a need for an optical recording medium capable of high-density and high-speed recording, and as one of concrete measures for responding to such need, an optical recording medium capable of recording and reproducing by means of blue wavelength laser beam is considered noticeable.

Among such optical recording media utilizing blue wavelength laser beam, optical recording media of the read only memory (ROM) type and optical recording media of the rewritable (RW) type have already been proposed.

However, there has been no proposal yet of a write-once type of optical recording medium capable of high speed recording utilizing laser beam with a wavelength shorter than blue wavelengths.

In one of recording structures for write-once type optical recording media that have been conventionally proposed, an organic dye is applied on a substrate. This structure utilizes the fact that the dye in a part irradiated with laser beam absorbs light and generates heat, by which the configuration or refractive index of the substrate is changed, and the part thus changed is read as the change in reflectance.

However, the recording sensibility of recording media using an organic dye is not high enough to perform high-speed recording. Also, if the laser beam wavelength is made shorter for increasing the recording density, it becomes difficult to synthesize dye that can be used with laser beam particularly with a wavelength shorter than blue wavelengths.

Although proposals have been made to form a recording layer from an inorganic material (See Japanese Patent Publication No. 1992-838, for example), all of these conventional structures pose many problems such that they are not suitable for high-speed recording, their reliability in storage stability in the recorded state is not sufficiently high, and their reproduction durability is poor.

Under such circumstances, presently, there exists no write-once type optical recording medium that has high storage stability, is low-cost, and is capable of high-speed and high-density recording/storing.

Generally speaking, if the read power (the power of laser beam irradiated for reproducing recorded information) Pr is low, the ratio of noise to reproduced signal becomes relatively high to decrease the so-called CNR (carrier-to-noise ratio), and the reliability for reproduction is lowered by that much. On the other hand, if the write power (the power of laser beam irradiated for recording information) Pw is high, laser radiation equipment with higher output by that much is required, and the costs of parts and devices are increased. Further, the lifetime of laser tends to become shorter.

Therefore, in terms of the viewpoint of hardware such as disk drive, it is qualitatively preferable that the read power Pr is high and the write power Pw is low. In other words, the ratio Pw/Pr is desirably as close as possible to 1.

However, in conventional optical recording media, the ratio of write power Pw to read power Pr, Pw/Pr had to be set to "10 or more" for the reasons of securing stability in recording and reproduction, ensuring long term reliability and so on.

DISCLOSURE OF THE INVENTION

The present invention has been made to solve these conventional problems, and has an object of providing a write-once type optical recoding medium that is formed using an inorganic material, and is capable of performing write-once type optical recording at high speed and high density by means of laser beam with a wavelength equal to or shorter than blue wavelengths, and particularly that is capable of maintaining the recording and reproduction stability high while enabling the relative ratio of read power to write power to be set high.

This object is achieved by the constitution (the present invention) as described below.

(1) A recording and reproducing method for an optical recording medium, whereby the optical recording medium comprising a recording layer laminate including at least two subsidiary recording layers each having one type of metal as a main component is irradiated with laser beam with a wavelength in a range of 200 nm to 450 nm, at a recording-transferring rate of at least 35 Mbps, so that the main component metals contained in the respective subsidiary recording layers are thereby diffused and mixed, and this mixture forms an irreversible recording mark that has a reflectance lower than that of a part not irradiated with the laser beam, has been transformed into a single layer, and is thermally more stable than an unrecording part, the method being characterized in that, when a laser power of the laser beam used for recording to form the recording mark is denoted by Pw, and a laser power of laser beam used for reproduction by reading information from the recording mark thus formed is denoted by Pr, the laser powers Pw and Pr are set such that a ratio of the laser powers, Pw/Pr, belongs in a range of 2.0 to 8.0.

(2) The recording and reproducing method for an optical recording medium according to (1), wherein the recording layer laminate is constituted by two subsidiary recording layers, one of which has one metal selected from the group consisting of Al, Ag, Au, and Cu as the main component.

(3) The recording and reproducing method for an optical recording medium according to any one of (1) to (4), wherein the laser power Pw of the laser beam used during recording is set to a value within a range of 2.5 to 5.0 mW.

(4) The recording and reproducing method for an optical recording medium according to any one of (1) to (5), wherein the laser power Pr of the laser beam used during reproduction is set to a value within a range of 0.3 to 1.3 mW.

BEST MODE FOR CARRYING OUT THE INVENTION

Figure 1:
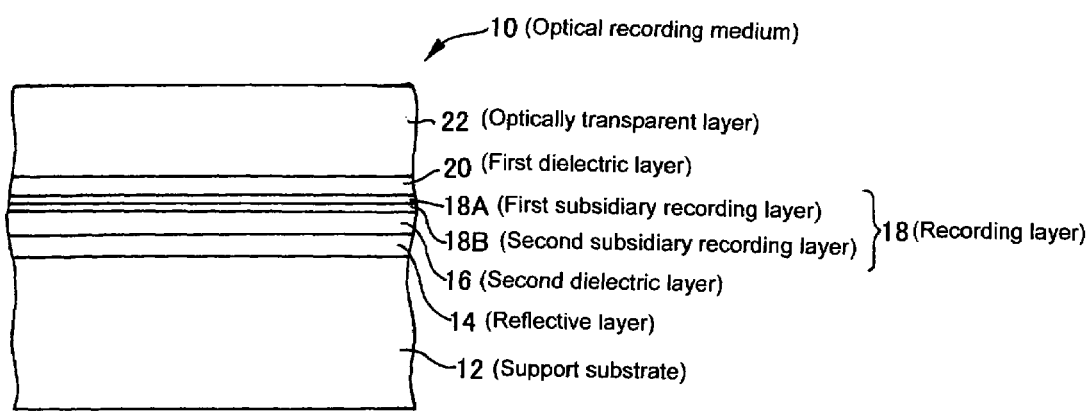
FIG. 1 is an enlarged cross sectional view schematically showing a high-speed write-once type optical recording medium according to an embodiment of the present invention.

An embodiment of the present invention will be described in a detailed manner with reference to the drawing.

As shown in FIG. 1, a high-speed write-once type optical recording medium (hereinafter called "optical recording medium") 10 to which the present invention is applied comprises a support substrate 12, and further comprises a reflective layer 14, a second dielectric layer 16, a recording layer (recording layer laminate) 18, a first dielectric layer 20, and an optically transparent cover layer 22, that are formed sequentially in this order on the support substrate 12. The optical recording medium 10 is constructed such that the recording layer 18 is irradiated with blue laser beam with a wavelength of 405 nm by a recording laser beam source through the optically transparent cover layer 22 so as to change the reflectance of the irradiated region, and this change in reflectance is used as a recording mark.

At least one layer in the recording layer 18 is preferably formed by employing, as a main component metal, any one of high-reflectance metals such as Al, Ag, Au, and Cu. Al and Ag are particularly preferable among these metals. This is because Al and Ag have high reflectance properties to laser beam with a wavelength equal to or shorter than blue wavelengths as well, therefore the reflectance can be adjusted easily by changing the film thickness of the subsidiary recording layer, and also the heat capacity of the film can be adjusted easily by changing the film thickness of the subsidiary recording layer. Thus it is possible to obtain a recording medium suitable for recording at a high speed, more than 35 Mbps, and also possible to set the reflectance of unrecording regions higher than the reflectance of the region after formation of a recording mark without using a dielectric layer.

The subsidiary recording layers constituting the recording layer laminate are preferably formed from a combination of such materials that a reaction product produced as the result of the recording as described above is stable, in other words, a stable reaction product (in the mixed state) is produced even in the condition where the recording layer laminate is diffused. The combination is preferably such that an intermetallic compound having a higher melting point than that of the main component metal of any one of the subsidiary recording layers is produced, and more preferably such that an intermetallic compound having a higher melting point than that of the main component metal of each of the subsidiary recording layers is produced.

Examples of such preferable combinations include Al—Sb, Al—Ca, Al—Ce, Al—La, Al—Se, Au—Ce, and Au—La.

The recording layer of the present invention, that is formed of inorganic materials, can be used for a wide range of wavelengths and exhibits sufficiently high signal quality even in a wavelength range equal to or shorter than blue wavelengths (between 200 and 450 nm). It is possible to provide a recording medium suitable for high speed recording (35 Mbps or more) by adjusting the heat capacity of the recording layer 18 by changing the thickness of the layer. Further, it is possible to easily obtain a structure (High to Low) in which the reflectance of an unrecording part is higher than that of a recorded part by changing the thickness of the subsidiary recording layers to adjust the heat capacity and at the same time by using high-reflectance metals.

For enabling high-speed recording, it is required to melt the subsidiary recording layers to carry out recording, and therefore the subsidiary recording layers preferably have a melting point lower than 1000° C. Also, the subsidiary recording layers are preferably stable at room temperature so that the components of the recording layer laminate are not mixed during storage of the recording medium.

A most preferable recording medium 10, in terms not only of the above-described aspects but also of storage reliability, can be obtained when the recording layer 18 is constituted by a subsidiary recording layer having Al as the main component and another subsidiary recording layer having Sb as the main component.

In consideration of this point, the recording layer 18 in this embodiment is constituted by laminating the first subsidiary recording layer 18A having Al as the main component and the second subsidiary recording layer 18B having Sb as the main component. When the recording layer 18 is irradiated with blue laser beam as recording beam, the main components Al and Sb contained in the first and second subsidiary recording layers 18A, 18B are diffused and mixed in the irradiated region, and a reaction product produced by this mixture changes the reflectance of the irradiated region, so that the change in reflectance can be recognized as recording mark (to be described in detail later).

Since the reaction caused by these two main component metals being diffused and mixed is irreversible, the recording layer 18 is capable of optical recording in write-once read-many fashion.

The thickness of the recording layer 18, or the total of the thicknesses of the first and second subsidiary recording layers 18A and 18B is 3 to 50 nm, and preferably 5 to 20 nm. Qualitatively speaking, if the recording layer 18 (subsidiary recording layers 18A and 18B) is too thin, it is difficult to ensure a sufficient reflectance difference between before and after recording in the recording mark. On the other hand, if the recording layer 18 is too thick, the heat capacity becomes large and hence the recording sensitivity is decreased.

The thicknesses of the subsidiary recording layers 18A and 18B should be determined appropriately so that a recording mark having high heat stability and a large difference in reflectance can be formed. For example, when a subsidiary recording layer having Al as the main component is combined with a subsidiary recording layer having Sb as the main component, it is assumed that an intermetallic compound having Al and Sb combined at the ratio of 1:1 is produced. Therefore it is preferable that the thicknesses of the respective subsidiary recording layers be set such that the ratio of Al and Sb (atomic ratio) is not largely deviated from 1:1.

The first and second dielectric layers 20 and 16 are provided if necessary. The first and second dielectric layers 20 and 16 may be formed of various types of dielectric materials including oxides, sulfides, nitrides, fluorides, carbides, or mixtures thereof. More specifically, in the present embodiment, both the first and second dielectric layers 20 and 16 are formed by sputtering with the use of a $ZnS$—$SiO_2$ target (80 mol % $ZnS$ and 20 mol % $SiO_2$).

The first dielectric layer 20 has a thickness of 5 to 200 nm and is provided such that the recording layer 18 is sandwiched between the first dielectric layer 20 and the second dielectric layer 16. The second dielectric layer 16 has a thickness of 5 to 200 nm and is provided on the top of the reflective layer 14.

The first and second dielectric layers 20 and 16 also serve to protect the recording layer 18 from water vapor and other gases. In addition, by adjusting the thicknesses thereof, laser beam is allowed to interfere with itself in these layers so that the reflectance in unrecording part of the recording layer 18 is adjusted and the difference in reflectance between before and after an optical recording can be increased.

To supplement the description of the adjustment of reflectance, in a recording medium of the type in which the reflectance increases in the region irradiated with laser beam (low-to-high type), the reflectance before recording is low and hence the tracking servo signal and the focusing servo signal are low before recording. Further, since the reflectance in the prepit is still lower, it is difficult to reproduce a signal held by a prepit. Accordingly, the recording medium of the present embodiment is of the type in which the reflectance decreases in the region irradiated with laser beam (high-to-low type). According to the present embodiment, since the recording layer laminate is constituted by the first subsidiary recording layer 18A having Al as the main component and the second subsidiary recording layer having Sb as the main component, the reflectance of a recoding mark (recorded part) can be easily set lower than that of the unrecording region.

The support substrate 12 is made of polycarbonate with a thickness of 1.1 mm, for example.

The reflective layer 14 is a layer for example of silver alloy formed on the support substrate by sputtering or the like and has a thickness of about 10 to 200 nm. The reflective layer 14 is positioned in a deep side than the recording layer 18 when viewed from the incidence side of laser beam to give returned beam to the recording layer 18, so that the reflective layer 14 contributes to increase the difference in reflectance between before and after recording and also to enhance the recording sensitivity. The reflective layer 14 may be constituted by a metal (including metalloid) film, dielectric multilayer film or the like. In the present embodiment, the reflective layer 14 is formed of an AgPdCu alloy mainly comprising silver with a thickness of 100 nm. The reflective layer 14, however, is not always essential.

The optically transparent cover layer 22 is formed on the first dielectric layer 20 by the spin coating method or by bonding a preformed sheet member, and is constituted by an ultraviolet curing resin layer or a polycarbonate sheet. The thickness of the optically transparent cover layer 22 is determined in the total with the thickness of the first dielectric layer 20 such that, when the recording layer 18 is irradiated with blue laser beam having a wavelength of 405 nm using an objective lens 26 with a numerical aperture (NA) of 0.85, the blue laser beam can be focused onto the recording layer 18. In the present embodiment, the thickness is determined to be about 100 µm based on this condition.

Now, the read power (power of laser beam applied to reproduce recorded information, or laser power for reproduction) Pr and the write power (power of laser beam applied to record information, or laser power for recording) Pw will be described in detail.

As described before, if the read power Pr is low, the ratio of noise to reproduced signal becomes relatively high to decrease the so-called CNR, and the reliability for reproduction is lowered by that much.

On the other hand, if the write power Pw is high, laser radiation equipment with higher output by that much is required, and the costs of parts and devices are increased. Further, other disadvantages such as shortening of the lifetime of laser are also induced.

Therefore, in terms of the viewpoint of hardware such as disk drive, it is qualitatively preferable that the read power Pr is high and the write power Pw is low. In other words, the ratio Pw/Pr is desirably as close to 1 as possible.

However, for example in a typical conventional type of write-once, read-many optical recording medium structure using phase change materials, the reproduction quality is deteriorated at a temperature (150° C.–200° C.) at which the amorphous phase is crystallized, and therefore it was impossible to increase the read power Pr largely. As for the write power Pw, on the other hand, since the temperature at the irradiated part of the recording layer is required to be raised at least up to a temperature higher than the melting point (600° C. or higher), the write power Pw is also required to be high correspondingly. As a result, the ratio of the write power Pw to the read power Pr, Pw/Pr had to be 10 or more at the minimum.

In another typical conventional type of write-once, read-many optical recording medium structure using an organic dye, the thermal conductivity is as low as one-several tenth or less of that of an inorganic film and hence heat tends to build up during reproduction (particularly during continuous application of laser beam). More specifically, even though reproducing laser beam with relative low power is generally applied for reading a formed recording mark, the recording mark tends to be changed by repeated reproductions, and this constitutes a reason why the read power Pr cannot be increased largely.

Also, an organic dye is easily decomposed by beam of a wavelength equal to or shorter than blue wavelengths, and hence is easily deteriorated by reproduction using laser beam of a wavelength equal to or shorter than blue wavelengths. On the other hand, the write power Pw should be set higher than the read power Pr because the write power Pw induces decomposition of dye and deformation of the substrate. Further, as is also true when phase change materials are used, there will take place a phenomenon that the recording mark is deteriorated by heat generated during reproduction, and this phenomenon will be particularly remarkable when data is reproduced at an extremely high temperature such as in an on-vehicle drive device. In order to keep adequate stability in recording and reproducing data even in such hard conditions, the ratio between the write power Pw and the read power Pr, Pw/Pr was still required to be 10 or more at the minimum.

However, the optical recording medium 10 according to the present embodiment is particularly characterized in that the heat stability of the reaction product in a recording mark formed in the recording layer 18 (that is, heat stability after recording) is higher than the heat stability of an unrecording region where the first and second subsidiary recording layers 18A and 18B are simply laminated (that is, heat stability before recording).

More specifically, when irradiated with laser beam, the main component metals in the respective first and second subsidiary recording layers 18A and 18B are diffused and mixed, and it is believed that the main component metals in this state exist as an intermetallic compound or, if an intermetallic compound is not produced, they exist at least as a mixture in which the main compound metals are mutually bound.

For example, in the case of the present embodiment, the recording layer 18 is constituted by the first subsidiary recording layer 18A having Al as the main component and the second subsidiary recording layer 18B having Sb as the main component. The melting point of Al is 660° C. and the melting point of Sb is 631° C. Both metals are thermally sufficiently stable themselves and, moreover, are meltable by laser beam irradiation. It is also possible, as the result of reaction between Sb and Al, to produce an intermetallic compound AlSb that has a melting point high enough (melting point of 1060° C.) in comparison with Al or Sb alone and will not change its crystalline structure between low and high temperatures. Note that, in such an intermetallic compound as AlSb, crystals are not required to be grown, and the recording is still possible even if the crystals are microcystals that are too fine to be detected by electron diffraction.

Describing this in phenomenal terms, when the recording layer 18 is irradiated with recording beam (laser beam) of a write power Pw capable of forming a recording mark, (A) in the region of the recording layer 18 where the mixture has not occurred, the mixture as described above is induced and the reflectance is changed (recording is enabled), whereas (B) in the region where a recording mark has already been formed, the reflectance does not change by the radiation of the recording beam. It can be said this is an ideal characteristic for a write-once type optical recording medium.

Accordingly, this optical recording medium 10 is stable even if stored in a high temperature environment since the recording mark formed of the reaction product will not change easily. The recording mark will not change easily either by continuous reproduction, and thus the optical recording medium excels in reproduction durability. Further, even if setting is made such that the reflectance after formation of the recording mark is low and the beam absorption after formation of the recording mark is increased, the optical recording medium will not be deteriorated by irradiation of reproducing laser beam or the like since the heat stability of the recording mark is high.

Therefore, even if a read power Pr is set relatively high or a write power Pw is set relatively low, the situation, which would lead to a problem in a conventional optical recording medium, will not pose any particularly serious problem in the optical recording medium 10 of the present invention.

The optical recording medium 10 of the present invention, having such characteristics, enables the ratio between write power Pw and read power Pr, Pw/Pr to be set to a value within the range of 2.0 to 8.0. In addition, the write power Pw can be set in "a low range" such as from 2.5 to 5.0 mW, while the read power Pr can be set in "a high range" such as from 0.3 to 1.3 mW (to be described later).

Further, the optical recording medium 10 of the present invention will not substantially develop a phenomenon called "cross erase" that erases, during recording, the recording mark in the adjacent track, since the recording mark has high heat stability. Because this enables the pitch of tracks to be set small, the optical recording medium 10 is also effective for high density recording.

It can be treated basically as a matter of supplied heat energy whether a recording mark can be formed or not, and hence laser beam of a wide range of wavelength from 200 nm to 450 nm can be utilized. In particular, since it is possible to use laser beam including blue laser beam of a wavelength of 405 nm and laser beam of a wavelength band shorter than this, the spot diameter can be minimized and this also contributes to making the optical recording medium effective for high density recording.

Still further, since the optical recording medium of the present invention involves no trouble such as rapid cooling or slow cooling, recording is possible even at a recording-transferring rate of 35 Mbps (or higher) for example. The recording-transferring rate of 35 Mbps as mentioned here corresponds to a recording-transferring rate as determined, taking efficiency into consideration, for (1.7) RLL modulation method when the channel bit length is 0.12 μm, the recording linear speed is 5.3 m/s, the channel clock is 66 MHz, and the format efficiency is 80%.

EXAMPLE 1

An optical recording medium 10 was produced to have a structure as shown in FIG. 1, and evaluated for write power Pw and read power Pr. The support substrate 12 was constituted by a 1.1 mm thick polycarbonate substrate having grooves formed at a groove pitch of 0.32 μm. The thickness of the optically transparent cover layer 22 was 100 μm. The other layers were fabricated by sputtering under the following conditions.

Dielectric layers 16 and 20: $ZnS+SiO_2$ (80:20 mol %)

First dielectric layer 20: 110 nm

Second dielectric layer 16: 90 nm

First subsidiary recording layer 18A: AlCr (98:2 atom %), 4 nm

Second subsidiary recording layer 18B: Sb, 6 nm

Reflective layer 14: Silver alloy AgPdCu, 100 nm

The optical recording medium 10 having such constitution was evaluated by means of an evaluation apparatus with a laser beam wavelength of 405 nm and having an objective lens group of numerical aperture NA of 0.85, by reproducing a random signal recorded using a multipulse strategy for irradiation of laser beam. Here, the reflectance of the unrecording part measured here was 19% and it was found that the optical recording medium 10 was of high-to-low type whereby the reflectance is decreased by recording. The recording-transferring rate was 35 Mbps (linear speed of 5.3 m/s).

On evaluation, the clock jitter value for reproduction of a signal recorded with a write power Pw of 2.0 mW or more was 9% or less. According to this evaluation, it can be said that the clock jitter value of 9% or less is a favorable value. Incidentally, the clock jitter value was obtained by finding a "fluctuation (σ)" of a reproduction signal by means of a time interval analyzer and then computing σ/Tw (Tw is one clock cycle).

Further, a clock jitter value of 9% or less could be obtained, also when recording was conducted using the write power Pw of 4 mW with the pulse width in the multipulse strategy decreased to about a half of the case when the write power Pw was 2.0 mW.

On the contrary, if the write power Pw was below 2.0 mW, a clock jitter value of 9% or less could not be obtained even if the pulse width was increased, and it was confirmed that such write power was insufficient.

Similarly, evaluation was performed by the recording conducted at a recording-transferring rate of 70 Mbps (linear speed of 10.6 m/s), a clock jitter value of 9% or less was obtained for a signal recorded with a write power Pw of 2.5 mW or more.

On the other hand, for evaluation of reproduction durability, a same track (groove) was irradiated with laser beam continuously for one minute at a recording-transferring rate of 35 Mbps (linear speed of 5.3 m/s), and the level of deterioration in the signal thus recorded was evaluated.

As a result, if the read power Pr went lower than 0.3 mW, the CNR became remarkably worse and the clock jitter value exceeded 9%. If the read power Pr became 0.3 mW or more, the CNR was gradually bettered along with the increase of laser power, and favorable signal characteristics could be obtained till about 1.0 mW.

However, when the read power Pr was increased further, over 1.0 mW, the reflection level of the unrecording part changed and the reflectance started decreasing.

EXAMPLE 2

An optical recording medium was produced under entirely the same conditions as Example 1 except that only the film thickness of the first dielectric 20 was changed to 80 nm. In this Example 2, the measurement of reflectance of an unrecording part found that the reflectance was 42%, and thus it was confirmed that the optical recording medium was of high to low type whereby the reflectance is lowered by recording.

Upon evaluating the optical recording medium by recording at a recording-transferring rate of 35 Mbps (linear speed of 5.3 m/s), the clock jitter value for reproduction of a signal recorded with a write power Pw of 2.5 mW or more was 9% or less. Further, upon evaluating the optical recording medium by recording at a recording-transferring rate of 70 Mbps (linear speed of 10.6 m/s), the clock jitter value for a signal recorded with a write power Pw of 3.0 mW or more was 9% or less.

On the other hand, for evaluation of reproduction durability, a same track (groove) was irradiated with laser beam continuously for one minute at a recording-transferring rate of 35 Mbps (linear speed of 5.3 m/s) and the level of deterioration in the signal thus recorded was evaluated. As a result, if the read power Pr went lower than 0.3 mW, the clock jitter value exceeded 9% and the CNR became worse. On the other hand, if the read power Pr became 0.3 mW or more, the CNR was gradually bettered along with the increase of laser power, and favorable signal characteristics could be obtained.

However, if the read power Pr exceeded 1.3 mW, the reflection level in the unrecording part started changing and decrease of reflectance was observed.

CONCLUSION OF SIMILAR EXAMPLES

Similar evaluations to those of Example 1 or Example 2 were conducted repeatedly while slightly changing the conditions to find that favorable results were obtained when the ratio between read power Pr to write power Pw, Pw/Pr was set to a predetermined value contained in a range from 2.0 to 8.0. Specifically, the lower limit is more preferably 2.2 and further more preferably 2.8, while the upper limit is more preferably 6.0 and further more preferably 5.5.

In addition, merits of the present invention can be enjoyed most effectively when the read and write powers Pw and Pr are set to a predetermined value contained in the ranges as described below.

The preferable range of write power Pw is from 2.5 to 5.0 mW, and, more preferably, the lower limit is 3.0 mW while the upper limit is 4.0 mW. Since the write power Pw can be set low like this, there is no need to provide high-output laser radiation equipment and thus the costs of components and devices can be decreased. Also, the lifetime of laser can be increased by that much.

On the other hand, the preferable range of read power Pr is from 0.3 to 1.3 mW and, more preferably, the lower limit is 0.4 mW while the upper limit is 1.0 mW. Since the read power Pr can be maintained relatively high like this, the CNR can be kept high and the reproduction reliability can be improved.

Although in the optical recording medium 10 according to the above-mentioned embodiment, the recording layer 18 is provided between the first and second dielectric layers 20 and 16, the present invention is not limited to this. It is not always necessary to provide a dielectric layer on one side or both sides of the recording layer.

Although the recording layer 18 is constituted by the first and second subsidiary recording layers 18A and 18B, the recording layer may be constituted by at least two subsidiary recording layers, for example by three or more subsidiary recording layers. Also, it doesn't matter which subsidiary recording layer resides on the beam incidence side.

Further, the first and second subsidiary recording layers 18A and 18B constituting the recording layer 18, having Al and Sb as the main components respectively, may contain solely these main component metals, but also may contain other additive elements.

In this case, however, the content of the main component metals in the respective subsidiary recording layers should preferably be at least 80 atom %, and more preferably at least 90 atom %. If the content of the main component metals in the subsidiary recording layers is too small, it will be difficult to obtain sufficiently high thermal stability for a recording mark.

Although in the recording layer 18 according to the embodiment described above, the first subsidiary recording layer 18A and the second subsidiary recording layer 18B are directly in contact with each other, an intermediate layer having another element as the main component may be interposed therebetween.

The material of the optically transparent cover layer 22 is not limited to an ultraviolet curable resin. The cover layer 22 may be formed of any other material so far as the cover layer 22 protects the recording layer 18 and transmits recording-reproducing beam.

Further, although the optical recording medium 10 according to the embodiment described above employs a reflective layer of a silver alloy, the present invention is not limited to this and the reflective layer is not always necessary to use. The reflective layer may also be constituted by a metal (including metalloid) film, dielectric multilayer film or the like so far as it reflects recording/reproducing beam.

Although in the embodiment above, evaluation of the optical recording medium 10 was conducted by actually recording information therein at a recording-transferring rate of 35 Mbps or 70 Mbps, it has been confirmed that it is quite possible to use a recording-transferring rate of up to about 100 Mbps.

Further, although in the embodiment above, the wavelength of laser beam is set to a blue wavelength of 405 nm, it is also possible to set the wavelength shorter than this (actually up to about 200 nm).

Rather, it can be said that it is for the high-speed and high-density recording under such conditions that the advantages of the present invention are exhibited more effectively.

However, the recording/reproducing conditions for a write-once type optical recording medium according to the present invention are not limited to those mentioned in the above. For example, on the contrary, it has been confirmed that the merits of the present invention can be obtained also by using laser beam with a red wavelength longer than blue wavelengths (particularly, laser beam of a wavelength up to about 700 nm). Accordingly, if further cost down is intended, for example, the present invention may be applied to a laser radiation system of red wavelengths.

INDUSTRIAL APPLICABILITY

According to the present invention, it is possible to obtain a write-once type optical recording medium that is formed by using an inorganic material and is capable of write-once, read-many recording at high speed and high density with the use of laser beam of a wavelength equal to or shorter than blue wavelengths, and, in particular, that is low cost and capable of maintaining the recording and reproducing stability high while enabling the relative ratio of read power to write power to be set high.

The invention claimed is:

1. A recording and reproducing method for an optical recording medium, comprising following steps of:
   forming at least a recording layer laminate in the optical recording medium, the recording layer laminate comprising at least two subsidiary recording layers each having one type of metal as a main component, the recording layer laminate being to be irradiated with a laser beam with a wavelength in a range of 200 nm to 450 nm, at a recording-transferring rate of at least 35 Mbps, so that the main component metals contained in the respective subsidiary recording layers are thereby diffused and mixed to form an irreversible recording mark; and
   setting laser powers Pw and Pr such that a ratio of the laser powers Pw/Pr belongs in a range of 2.0 to 8.0, wherein the laser power Pw denotes a laser power of the laser beam used for recording to form the recording mark, and the laser power Pr denotes a laser power of laser beam used for reproduction by reading the recording mark thus formed.

2. The recording and reproducing method for an optical recording medium according to claim 1, wherein
   the recording layer laminate is constituted by two subsidiary recording layers, one of which has one metal selected from the group consisting of Al, Ag, Au, and Cu as the main component.

3. The recording and reproducing method for an optical recording medium according to claim 1, wherein the laser power Pw of the laser beam used during recording is set to a value within a range of 2.5 to 5.0 mW.

4. The recording and reproducing method for an optical recording medium according to claim 3, wherein the laser power Pr of the laser beam used during reproduction is set to a value within a range of 0.3 to 1.3 mW.

5. The recording and reproducing method for an optical recording medium according to claim 1, wherein the laser power Pr of the laser beam used during reproduction is set to a value within a range of 0.3 to 1.3 mW.

6. An optical recording medium comprising a recording layer laminate including at least two subsidiary recording layers each having one type of metal as a main component, wherein respective layers including the recording layer laminate are formed such that, when the recording layer laminate is irradiated with laser beam having a wavelength contained in a range of 200 nm to 450 nm and having a recording laser power Pw for recording information set to a predetermined value within a range of 2.5 to 5.0 mW at a recording-transferring rate of at least 35 Mbps, the main component metals contained in the respective subsidiary recording layers are thereby diffused and mixed to form a recording mark.

7. The optical recording medium according to claim 6, wherein the recording layer laminate is constituted by two subsidiary recording layers, one of which has one type of metal selected from the group consisting of Al, Ag, Au, and Cu as the main component.

* * * * *